(12) United States Patent
Ermagan et al.

(10) Patent No.: US 8,949,931 B2
(45) Date of Patent: Feb. 3, 2015

(54) SYSTEM AND METHOD FOR MONITORING APPLICATION SECURITY IN A NETWORK ENVIRONMENT

(75) Inventors: Vina Ermagan, San Jose, CA (US); Suraj Nellikar, Santa Clara, CA (US); Sudarshana Kandachar Sridhara Rao, Karnataka (IN); Fabio R. Maino, Palo Alto, CA (US); Massimiliano Menarini, La Jolla, CA (US)

(73) Assignee: Cisco Technology, Inc., San Jose, CA (US)

( * ) Notice: Subject to any disclaimer, the term of this patent is extended or adjusted under 35 U.S.C. 154(b) by 241 days.

(21) Appl. No.: 13/462,110

(22) Filed: May 2, 2012

(65) Prior Publication Data

US 2013/0298184 A1 Nov. 7, 2013

(51) Int. Cl.
*G06F 17/00* (2006.01)
*H04L 29/06* (2006.01)

(52) U.S. Cl.
CPC .............. *H04L 63/20* (2013.01); *H04L 63/102* (2013.01)
USPC .......................................................... 726/1

(58) Field of Classification Search
CPC .... H04L 63/20; H04L 63/102; G06F 21/6218
USPC ................................................ 726/26–30, 1
See application file for complete search history.

(56) References Cited

U.S. PATENT DOCUMENTS

| | | | |
|---|---|---|---|
| 6,247,057 B1 | 6/2001 | Barrera, III | |
| 6,286,040 B1 | 9/2001 | Durham et al. | |
| 6,363,081 B1 | 3/2002 | Gase | |
| 6,760,804 B1 | 7/2004 | Hunt et al. | |
| 7,222,173 B2 | 5/2007 | Goodman | |
| 7,516,211 B1 | 4/2009 | Gourlay et al. | |
| 7,664,963 B2 | 2/2010 | Kohler, Jr. et al. | |
| 2003/0014524 A1 | 1/2003 | Tormasov | |
| 2005/0108723 A1 | 5/2005 | Burckart et al. | |
| 2005/0232256 A1 | 10/2005 | White et al. | |
| 2006/0230219 A1 | 10/2006 | Njoku et al. | |
| 2006/0230407 A1 | 10/2006 | Rosu et al. | |
| 2007/0028244 A1 | 2/2007 | Landis et al. | |

(Continued)

OTHER PUBLICATIONS

Lin Tan, Timothy Sherwood; Jan. 2006; Architectures for Bit-Split String Scanning in Intrusion Detection, IEEE, https://www.cs.ucsb.edu/~sherwood/pubs/IEEEMicro-bitsplit.pdf, p. 3.*

(Continued)

*Primary Examiner* — Anthony Brown
(74) *Attorney, Agent, or Firm* — Patent Capital Group

(57) ABSTRACT

A method includes determining an application role in a distributed application in a network environment, generating a role profile for the application role from an interaction pattern, mapping the role profile to a virtual machine (VM), and detecting a security breach of the VM. Determining the application role includes obtaining network traces from the distributed application, and analyzing the network traces to extract the application role. In one embodiment, detection of the security breach includes generating an access control policy for the VM from the role profile, and determining an anomaly in traffic based thereon. In another embodiment, detection of the security breach includes inserting the role profile in a port profile of the VM, generating a small state machine from the role profile, running the small state machine on a port associated with the VM, and inspecting, by the small state machine, an application level traffic at the port.

20 Claims, 6 Drawing Sheets

(56) References Cited

U.S. PATENT DOCUMENTS

| | | | |
|---|---|---|---|
| 2008/0127292 A1* | 5/2008 | Cooper et al. | 726/1 |
| 2008/0163207 A1 | 7/2008 | Reumann et al. | |
| 2008/0201414 A1 | 8/2008 | Amir Husain et al. | |
| 2008/0225877 A1 | 9/2008 | Yoshida | |
| 2008/0271016 A1 | 10/2008 | Chess et al. | |
| 2008/0275975 A1 | 11/2008 | Pandey et al. | |
| 2009/0025007 A1 | 1/2009 | Hara et al. | |
| 2009/0288135 A1 | 11/2009 | Chang et al. | |
| 2009/0292858 A1 | 11/2009 | Lambeth et al. | |
| 2009/0328193 A1 | 12/2009 | Moore et al. | |
| 2010/0046531 A1 | 2/2010 | Louati et al. | |
| 2010/0131636 A1 | 5/2010 | Suri et al. | |
| 2010/0165877 A1 | 7/2010 | Shukla et al. | |
| 2010/0214949 A1 | 8/2010 | Smith et al. | |
| 2011/0085563 A1 | 4/2011 | Kotha et al. | |
| 2011/0202675 A1 | 8/2011 | Faulk, Jr. | |
| 2011/0239268 A1 | 9/2011 | Sharp et al. | |
| 2011/0255538 A1 | 10/2011 | Srinivasan et al. | |
| 2012/0005346 A1* | 1/2012 | Burckart et al. | 709/226 |
| 2012/0054624 A1 | 3/2012 | Owens et al. | |
| 2012/0180042 A1 | 7/2012 | Tsirkin et al. | |
| 2012/0201169 A1 | 8/2012 | Subramanian et al. | |
| 2013/0031544 A1 | 1/2013 | Sridharan et al. | |

OTHER PUBLICATIONS

U.S. Appl. No. 13/293,421, filed Nov. 11, 2011, entitled "Dynamic Policy Based Interface Configuration for Virtualized Environments," Inventors: Anuraag Mittal, et al.

Ping Lin, et al., "Data and Application Security for Distributed Application Hosting Services, Chapter VIII in Information Security Policies and Actions in Modern Integrated Systems," Fugini, et al., eds., Feb. 2004, 78 pages; http://www.public.asu.edu/~candan/papers/chapterfinal.pdf.

Cisco, "Cisco Nexus 1000V Series Switches," Product Overview Data Sheet, © 2012, 18 pages; http://www.cisco.com/en/US/prod/collateral/switches/ps9441/ps9902/data_sheet_c78-492971.pdf.

Riverbed® Cascade® Product Family, "Riverbed Technology Overview," 2011 brochure, 4 pages; http://www.riverbed.com/assets/media/documents/data_sheets/DataSheet-Cascade-Product-Family-Brochure.pdf.

Liz White, George Mason University, Lecture, CS 707—Distributed Software Systems, Distributed Computing Paradigms, Spring 2007, 36 pages.

Mar. 29, 2013 Non-Final Office Action from U.S. Appl. No. 13/293,421.

Oct. 17, 2013 Final Office Action from U.S. Appl. No. 13/293,421.

Apr. 22, 2014 Non-Final Office Action from U.S. Appl. No. 13/293,421.

Sep. 9, 2014 Final Office Action from U.S. Appl. No. 13/293,421.

* cited by examiner

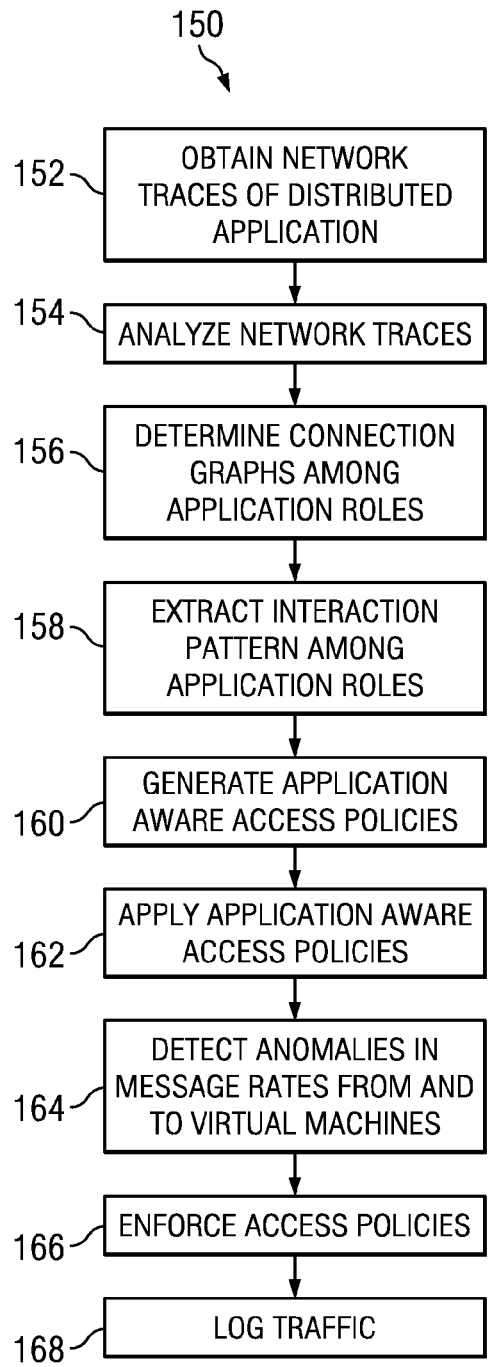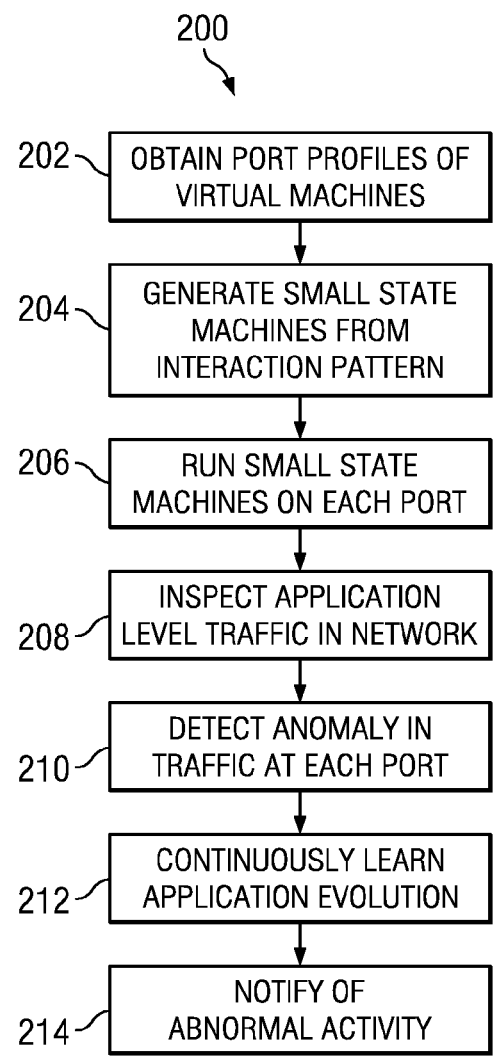
FIG. 8
FIG. 9

US 8,949,931 B2

SYSTEM AND METHOD FOR MONITORING APPLICATION SECURITY IN A NETWORK ENVIRONMENT

TECHNICAL FIELD

This disclosure relates in general to the field of communications and, more particularly, to a system and a method for monitoring application security in a network environment.

BACKGROUND

A virtualization trend in the information technology (IT) arena is driving the development of many virtualization technologies such as network virtualization. Network virtualization solutions can consolidate multiple physical networks into one virtual network. They can also logically segment a single physical network into multiple logical networks. Partitions can be added to rapidly scale the network for business needs. Network virtualization represents a new IT paradigm, challenging existing physical network deployment models. Network virtualization offers many benefits such as expanding availability of single IT assets to multiple users, managing multiple IT assets as a single resource, and providing dedicated virtual networks for applications: all of which can lead to revenue generation, expense reduction, and customer satisfaction.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 7-9 are simplified flow diagrams illustrating example operational steps associated with various embodiments of the system.

DETAILED DESCRIPTION OF EXAMPLE EMBODIMENTS

Overview

An example method includes determining an application role in a distributed application in a network environment, generating a role profile for the application role from an interaction pattern of the application role with other application roles in the distributed application, mapping the role profile to a virtual machine (VM) in the network environment, and detecting a security breach of the VM. In a particular embodiment, determining the application role includes obtaining network traces from the distributed application, and analyzing the network traces to extract the application role.

In one embodiment, detection of the security breach includes generating an access control policy for the VM from the role profile, and determining an anomaly in traffic of the VM based on the access control policy. In another embodiment, detection of the security breach includes adding the role profile in a port profile of the VM, generating a small state machine from the role profile, running the small state machine on a port associated with the VM, inspecting (e.g., by the small state machine), an application level traffic at the port, and determining an anomaly in traffic of the VM based on a change of state of the small state machine.

The method may further include determining a connection graph among the application roles and applying the connection graph to an access control list for the VM. In other embodiments, the method may further include configuring a firewall with the access control policy, and performing an action selected from a group consisting of logging traffic patterns, logging, re-directing traffic, dropping traffic, and allowing traffic in the network environment.

Example Embodiments

Figure 1:
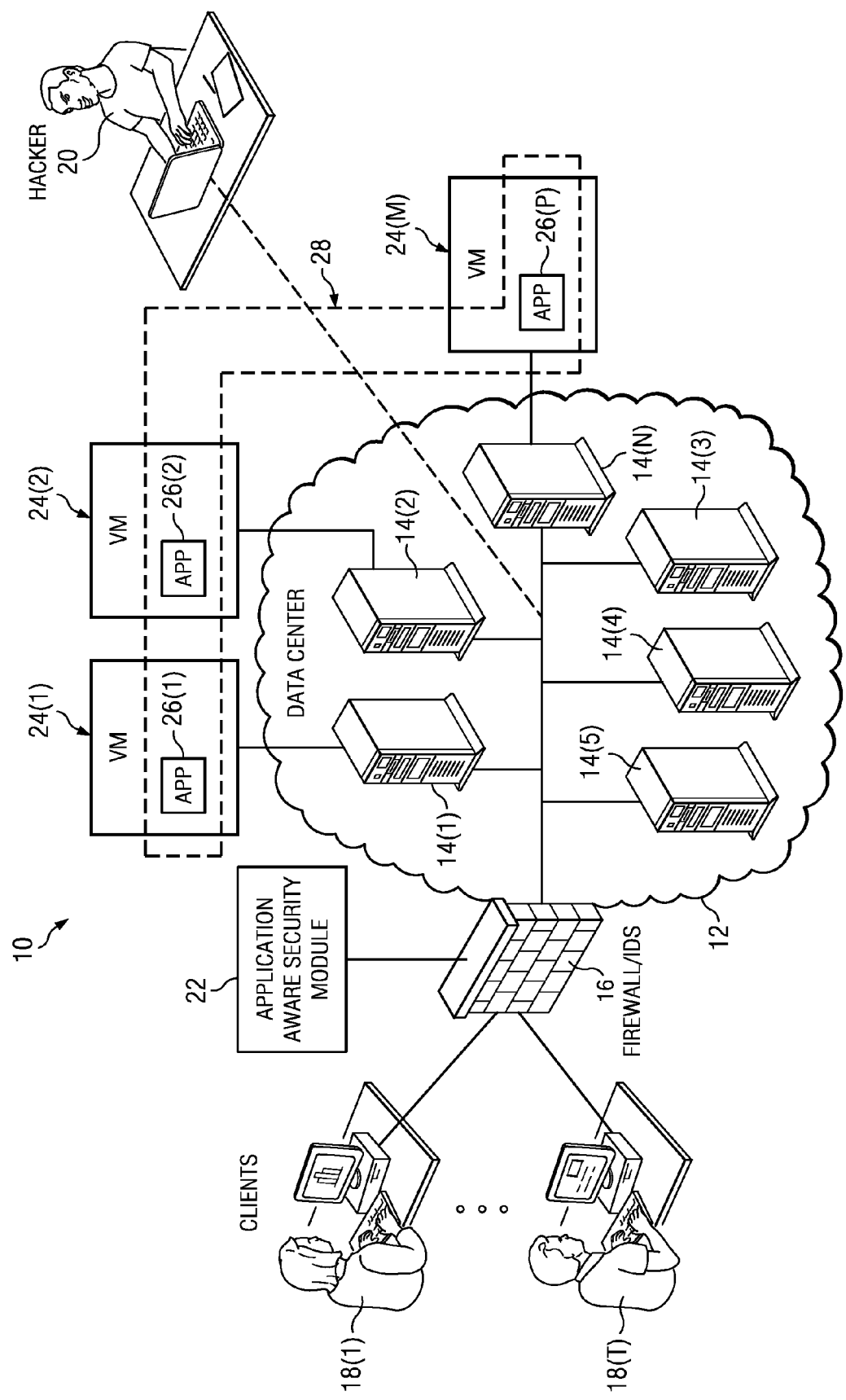
FIG. 1 is a simplified block diagram illustrating a system for monitoring application security in a network environment.

Turning to FIG. 1, FIG. 1 is a simplified block diagram illustrating a communication system 10 for monitoring application security in a network environment. FIG. 1 includes a network 12 comprising one or more servers 14(1)-14(N). For example, servers 14(1)-14(N) may include web servers (e.g., 14(1), 14(2)); application servers (e.g., 14(3), 14(4)); and database servers (e.g., 14(5), 14(N)). A firewall 16 may intercept traffic from clients 18(1)-18(T) who communicate with servers 14(1)-14(N). A hacker 20 may attempt to bypass firewall 16 to gain access to servers 14(1)-14(N). An application aware security module 22 may be provisioned in network 12 to detect security breaches, for example, attempts by hacker 20 to infiltrate network 12 and gain access to one or more virtual machines (VMs) 24(1)-24(M) in network 12.

As used herein, the term "virtual machine" encompasses a software implementation of a computer that executes programs (e.g., like a physical machine). Multiple VMs 24(1)-24(M) each running its own operating system (OS) may exist in any one or more servers 14(1)-14(N). Applications 26(1)-26(P) may run on one or more VMs 24(1)-24(M) in network 12. Applications 26(1)-26(P) may include web services (e.g., 26(1)) that run on dedicated web servers (e.g., 14(1)), application services (e.g., 26(2)) that run on dedicated application servers (e.g., 14(3)), and database services (e.g., 26(P)) that run on dedicated database servers (e.g., 14(N)).

A suitable combination of applications 26(1)-26(P), for example, {26(1), 26(2), 26(P)}, that provides a particular set of functionalities (e.g., that permit client 18(1) to connect to network 12, and to fulfill a transaction, such as a file transfer, using a Web based interface) may be included in a distributed application 28. As used herein, the term "distributed application" refers to a computer program that runs on more than one computer (physical or virtual) (e.g., VMs 24(1)-24(M)) in a network (e.g., 12). Distributed applications do not have a fixed topology; for example, each instance of distributed application 28 may comprise a different logical set of applications 26(1)-26(P) that provide the same functionalities, but run on disparate VMs 24(1)-24(M). VMs 24(1)-24(M) that execute distributed application 28 at any instant in time may vary with network load, resource availability, etc. Typically, distributed applications (e.g., 28) can comprise multiple tiers, where each tier embodies various hardware, software servers, and management tools with a myriad configuration parameters; moreover, distributed applications (e.g., 28) can run over heterogeneous hardware platforms and operating systems.

In a logical sense, distributed application 28 may include several layers of applications, for example, a web application layer (e.g., 26(1)) that supports hyper text transfer protocol (HTTP) requests from clients 18(1)-18(T); an application layer (e.g., 26(2)), that provides personalized content to clients 18(1)-18(T); and a database layer (e.g., 26(P)), that supports content management, business object persistence, and other data storage needs. In another logical sense, distributed application 28 may include a presentation layer (e.g., static web pages, Ajax pages, etc.), a business layer (e.g., Enterprise JavaBeans (EJB), legacy applications, etc.), and a persistence layer (e.g., relational databases, file servers, etc.) Note that an "application" as used herein this Specification, including applications 26(1)-26(P) and distributed application 28, can be inclusive of an executable file comprising instructions that can be understood and processed on a computer, and may further include library modules loaded during execution, object files, system files, hardware logic, software logic, or any other executable modules.

In a general sense, characteristics that distinguish distributed applications (e.g., 28) from conventional applications (e.g., 26) that run on a single machine (e.g., VM 24) include inter-component communication and event synchronization. Distributed applications (e.g., 28) typically include participation of two or more independent application roles (across different machines) that can exchange data among themselves. As used herein, the term "application role" indicates a function in the distributed application (e.g., 28). For example, application 26(1) may perform a server role, waiting passively (listening) for requests; application 26(2) may perform a client role, issuing specific requests to the server role and awaiting a response. The application roles in distributed application 18 may be implementation independent and heterogeneous across different platforms. For instance, a Java role may interact with a .NET role. In some cases, a single application (e.g., 26(1)) may have multiple application roles (e.g., server role in one instance, and client role in another instance). In various embodiments, the application roles may be uniquely assigned to a corresponding one of VMs 24(1)-24(M), for example, depending on which VM is hosting application 26(1)-26(P) performing the application role.

Application roles in distributed application 28 interact with each other. For example, the client role may send a request to the server role in one interaction instance; the server role may respond to the client role in another interaction instance. Instances of such interactions may be grouped into an "interaction pattern." For example, the interaction pattern can include several groups of interaction sequences. The interaction pattern may comprise the application roles and the interactions among the application roles. In a general sense, the interaction pattern defines behavioral dependencies between the application roles. Typically, a particular distributed application (e.g., 28) may be characterized by a unique interaction pattern, distinct from other distributed applications in network 12.

According to embodiments of communication system 10, application aware security module 22 may inspect network traffic traversing network 12, and identify security breaches, for example, based on anomalies (e.g., deviations from expected behavior) observed in distributed application 28. As used herein, the term "security breach" refers to any act (or attempt) to bypass (or violate) security policies, practices, or procedures of network 12. Security breaches may include acts (or attempts) from outside network 12 and within network 12.

In various embodiments, application aware security module 22 may be a distributed module, which may have a centralized component.

For purposes of illustrating the techniques of communication system 10, it is important to understand the communications in a given system such as the architecture shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

A typical application infrastructure may consist of three components: a database management system, which maintains business data; application servers, which encode business logic of customers; and web servers, which provide a web interface between end-users and the business applications hosted by the application infrastructure. A typical use of such application infrastructure includes the customer (or application owner) with an application program publishing the application along with relevant data to host servers in the network. On an as-needed basis, the customers (or its clients) access the application remotely by passing appropriate parameter variables to the host using the web interface. Such user requests invoke appropriate program scripts in the application server, which in turn may query the underlying database for relevant data to dynamically generate and construct responses.

Such distributed applications can pose various security challenges due to the inherent nature of their distributed and mostly open nature. For example, in open wide area networks, where hosts are added and removed dynamically, there may be little trust between hosts and clients. In another example, executing an application remotely could expose the application code and data to potentially malicious entities. In yet other examples, system resources may be accessed by malicious or illegal clients so that sensitive information is leaked; authorized clients may access more resources than they are entitled to (e.g., through their service level agreements), thus damaging resources, or preventing other clients from accessing the resources; and clients' application and data may be leaked, modified or lost during transportation across insecure communication channels.

In distributed environments, application code can move among various distributed entities such as servers, virtual machines, etc. To ensure security of application code, the recipient (either client or server) may validate and origin and integrity of the code before loading, installing or executing the code. In particular, during execution, execution traces may permit the code owner to determine whether the application code is being executed properly. In a distributed application, the network administrator can utilize the application's current state, and records of previous interactions with other applications, to authenticate and verify execution. However, such execution trace analysis is performed after the fact, and therefore, does not predict unauthorized attempts, and cannot offer timely authentication.

In an alternate method, a secure agent interaction mechanism can keep track of application' histories, actions and messages exchanged, states of the applications, and knowledge derived from the states. In such a scheme, the network administrator may specify certain unauthorized actions. Secure interactions in such a scheme may be defined in terms of secure histories that do not leak information via messages exchanged between the applications and actions that do not fall into the "unauthorized actions" category. However, maintaining correct and accurate information about an application's state and actions can be almost impossible, especially in complex distributed networks.

Network security devices such as firewalls and intrusion detection systems (IDSs) target network security by observing well-defined network protocol signatures, or performing coarse-grained anomaly detection based on general traffic characteristics. These systems may provide only minimal application-level security, because they may not be aware of custom application logic deployed over the network. Moreover, firewalls may be difficult to configure on an application level, and IDS (especially anomaly detection based) at this level may have excessive false positives. Signature based IDS cannot detect unknown attacks. Insider/hacker attacks may also be hard to detect when firewalls and IDS are implemented at the network edge. In a data center network environment, merely applying IP based access control lists (ACLs) (as currently implemented in typical networks) may not be practical considering mobility of VMs across the data center. An "access control policy" authorizes users (e.g., clients) to access certain services within the protected network (e.g., 12). Unless authorized through one or more access control policies, clients may have no access to any services within the protected network. Many data centers may use certain specialized VMs to filter traffic. However, even in such environments, any security breach of IPs, TCP ports or any layer 7 applications may be hard to detect.

Communication system 10 is configured to address these issues (and others) in offering a system and method for monitoring application security in a network environment. Embodiments of communication system 10 may determine application roles in distributed application 28, and generate role profiles for the application roles from the interaction pattern amongst the application roles. As used herein, the term "role profile" encompasses properties associated with a corresponding application role in distributed application 28, which may be inclusive of traffic patterns, the interaction pattern, network load, expected sequence of packet types, and/or other such network and application characteristics of the corresponding application role. Each application role in distributed application 28 may have a corresponding role profile, describing the application role's network characteristics (e.g., IP address of source and destination, protocol, etc.) and application characteristics (e.g., client role, server role, etc.). The role profile for a specific application role may indicate, for example, the other application roles that interact with the specific application role, the type of protocol used by the specific application role, the number of packets that are typically received or sent by the specific application role, the message rate from and to the specific application role, etc. Embodiments of communication system 10 may map the role profiles to applicable VMs 24(1)-24(M) that host applications 26(1)-26(P) comprising distributed application 28, and detect, based on the role profiles, security breaches in VMs 24(1)-24(M).

Application aware security module 22 may detect and facilitate securing VMs 24(1)-24(M) with a known traffic pattern using the role profiles, and may notify clients 18(1)-18(T) about any abnormal activity. In some embodiments, application aware security module 22 may detect security breaches by learning the interaction pattern from input and output traces and applying the learning to network traffic of distributed application 28 in network 12. In various embodiments, application aware security module 22 may define role profiles to detect anomalies in traffic in network 12 and dynamically trigger actions for fine tuned logging of suspicious activity. Other actions include re-directing traffic, dropping traffic, or allowing traffic in the network environment.

According to various embodiments, application aware security module 22 may obtain network traces of distributed application 28 during a staging phase. As used herein, the term "network trace" encompasses details of network traffic, including source IP address, destination IP address, port, group identification, etc. that is collected by a network monitor (e.g., a computer program that captures traffic across a network interface card). The staging phase refers to a pre-production testing of application configuration. The staging phase is typically implemented to verify functionalities, performance, and inefficiencies (e.g., over-provisioned configurations) of distributed application 28. The staging phase may also uncover other application properties such as failure modes, failure rates, degree of administrative attention required, etc. Staging may be used to evaluate system responses to dynamic environmental changes such as workload variations and software/hardware upgrades.

From the staging phase measurements of network traces, embodiments of communication system 10 may identify application roles and learn the interaction pattern between the application roles. Application aware security module 22 may create the role profiles using reusable interaction libraries capturing the abstract interaction pattern of the application roles. "Interaction libraries" may include a collection of software resources (e.g., routines, functions, variables, etc.) that can be used to generate the role profiles. Using the role profiles, application aware security module 22 may configure distributed firewalls/IDS 16 to detect security breaches in network 12. In some embodiments, application aware security module 22 may improve firewall deployment, for example, by learning the abstract application roles and their communication patterns, generating host firewall policies by mapping application roles to VMs 24(1)-24(M), inferring an interaction state by observing communication history and dynamically adapting firewall rules. In various embodiments, application aware security module 22 may contribute to anomaly based IDS using causal dependencies discovered to optimize distribution of IDS agents, improving detection capabilities by focusing on high level interactions between application roles and automatically generating libraries modeling application behavior.

Turning to the infrastructure of communication system 10, the network topology can include any number of servers, VMs, switches, routers, and other nodes inter-connected to form a large and complex network 12. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that the architecture shown in FIG. 1 is simplified for ease of illustration. For example, network 12 may comprise access switches, aggregation switches, core switches to aggregate and distribute ingress (upstream traffic), and egress (downstream traffic) traffic, etc. A plurality of switches (virtual and/or physical) may be provided at each access, aggregation, and core level to achieve redundancy within network 12.

The example network environment may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Firewall 16 may include a device, set of devices or applications, configured to permit or deny network transmissions based on a set of ACLs, monitor network traffic entering and leaving the network (e.g., 12), and monitor/report policy violations. Firewall 16 may include packet filters, stateful filters, application layer filters, proxies, network address translation (NAT) devices, etc. Firewall 16 may include IDS, which are independent platforms that identify intrusions by examining network traffic and monitoring multiple hosts, and agents on host devices that identify intrusions by identifying system calls, application logs, file-system modifications, etc. Firewall 16 can also include intrusion prevention systems that can detect unauthorized actions and prevent security breaches before they happen. In some embodiments, firewall 16 may be located at an entry point into network 12, for example, implemented on a router. In other embodiments, firewall 16 may be distributed across network 12, for example, at network interface cards at each of servers 14(1)-14(N) in network 12.

Application aware security module 22 is an application implemented on one or more suitable network elements configured with appropriate hardware and software components to perform the operations described herein. As used herein, the term "network element" is meant to encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. In some embodiments, application aware security module 22 may be a distributed application that may have a component that performs the centralized analysis and learning where needed, and the monitoring and detection can happen in a distributed fashion. The distributed components may be implemented on switches, hosts, vNICs, NICs, or other network elements. In some embodiments, application aware security module 22 may be implemented on appropriate VMs 24(1)-24(M) in network 12.

Figure 2:
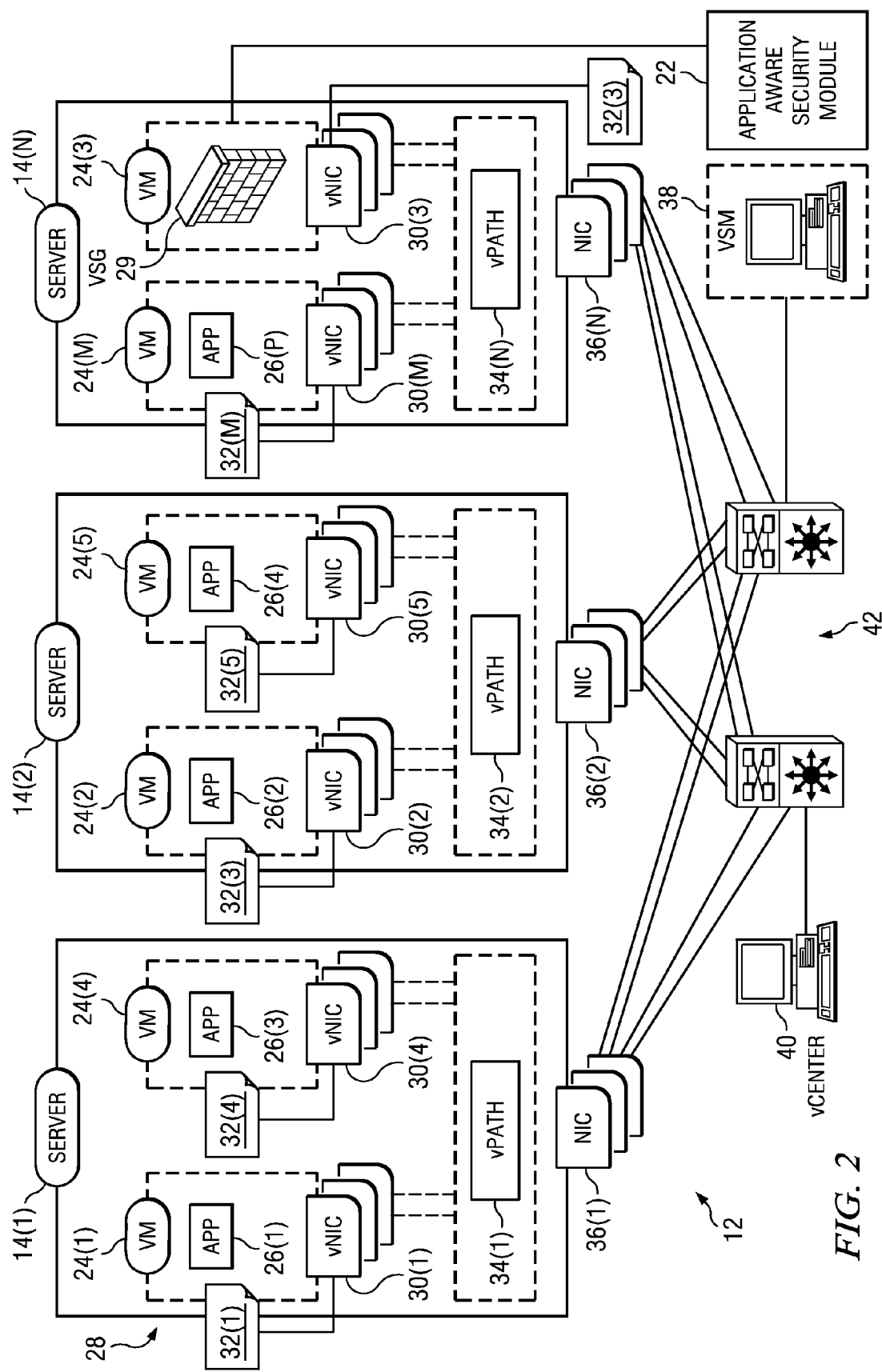
FIG. 2 is a simplified block diagram illustrating example details of the system in accordance with one embodiment.

Turning to FIG. 2, FIG. 2 is a simplified block diagram illustrating an example embodiment of communication system 10. A plurality of VMs 24(1)-24(M) is hosted on servers 14(1)-14(N). Applications 26(1)-26(P) are hosted on VMs 24(1)-24(M). Distributed application 28 may include applications 26(1), 26(2), and 26(P). A virtual security gateway (VSG) 29 may be installed on a VM (e.g., 24(3)) in a server (e.g., 14(N)). VSG 29 is a virtual appliance that can help ensure that access to network 12 is controlled and monitored through established security policies. Each of VMs 24(1)-24(M) may be associated with respective virtual network interface cards (vNICs) 30(1)-30(M). vNICs 30(1)-30(M) communicate with other VMs or external devices using soft switches (e.g., Cisco Nexus 1000V; VM-FEX; etc.) vNICs 30(1)-30(M) may be associated with respective port profiles 32(1)-32(M), which can contain static properties and context aware rule sets that specify access policies for traffic entering and exiting corresponding vNICs 30(1)-30(M). Port profiles 32(1)-32(M) can carry information regarding Layer 2, Layer 3 and security, queuing information etc.

Each of servers 14(1)-14(N) may host a virtual infrastructure (e.g., hypervisor) that in turn, hosts VMs 24(1)-24(M). The virtual infrastructure in each of servers 14(1)-14(N) may include respective vPaths 34(1)-34(N) that steer traffic from and to VMs 24(1)-24(M) to VSG 29. Initial packet processing may occur in VSG 29 for policy evaluation and enforcement. VSG 29 may have capabilities to inspect packets up to Layer 7 in network 12. Subsequent policy enforcement for the packets may be offloaded directly to each of vPaths 34(1)-34(N). vPaths 34(1)-34(N) may provide intelligent traffic steering (e.g., flow classification and redirection to associated VSG 29), and fast path offload for policy enforcement of flows (e.g., offloaded from VSG 29). vPaths 34(1)-34(N) may be configured for multi-tenancy, providing traffic steering and fast path offload on a per-tenant basis. Each server 14(1)-14(N) may include physical network interface cards (NICs) 36(1)-26(N) for connecting to network 12.

The virtual network may be managed through a virtual supervisor module (VSM) 38 that communicates with a vCenter server 40, which may comprise a server configured suitably for virtualization management. In some embodiments, VSM 38 may be integrated with vCenter 40. In other embodiments, VSM 38 may be implemented as one of VMs 24(1)-24(M) in network 12. The network may be interconnected by a distributed virtual switch DVS 42 that may span many servers and function as a single virtual switch across all associated hosts in network 12. For example, DVS 42 may include all virtual switches in each server 14. Network administrators can define configurations on all vNICs 30(1)-30(M) in network 12 from a single interface coupled to VSM 38.

Typically, any network traffic may follow a specific burst and pattern (e.g., sequence of connectivity). For example, a network connection with VM 24 may first trigger Dynamic Host Configuration Protocol (DHCP). For ease of description, any one of VMs 24(1)-24(M) may be referenced as VM 24. VM 24 may connect to certain update servers to perform virus update checks, software update checks and such other updating and security check activities, followed by a multicast join to groups (e.g., VLANs). VM 24 may subsequently allow hypertext transfer protocol (HTTP) ports to be opened for communication. The pattern for such network connectivity can specify a burst and sequence of network connectivity.

Associating the burst and pattern with a type of virtual machine instead of a specific IP address may be crucial in the cloud environment because the IP address may be dynamic and could change with VM migration across the data center. Moreover, when several VMs 24(1)-24(M) perform similar functionalities, it may be simpler to associate the burst and pattern with the type of VM rather than the specific IP address. Application aware security module 22 may facilitate associating traffic bursts and patterns with types of VMs rather than specific IP addresses. For example, application aware security module 22 may associate traffic bursts and patterns with corresponding application roles and incorporate the traffic bursts and patterns into appropriate role profiles.

Likewise, application aware security module 22 may facilitate identifying and reporting unexpected behavior in virtual machines during debugging to correct the problem early on. Unexpected behavior could happen because of bugs in code, disconnect from specific hardware, etc. For example, VMs 24(1)-24(M) with flaws in code can be compromised with root access (e.g., kernel root kits), which can trigger various ports or methods to hijack the compromised virtual machines. In various embodiments, application aware security module 22 can identify the abnormality in virtual machine behavior and trigger an alarm. Moreover, application aware security module 22 may identify denial of service (DOS) and distributed denial of service (DDOS) attacks, and facilitate mitigation efforts.

Application aware security module 22 may communicate with VSG 29 to monitor application security in network 12. In one embodiment, using a combination of ACLs to block certain type of traffic, quality of service (QoS) settings to allow certain bursts, etc., and sequencing of patterns, among other features, application aware security module 22 can configure port profiles 32(1)-32(M) to handle security at the application level. In some embodiments, application aware security module 22 may store the role profiles associated with applications 26(1)-26(P) as a table or set of events in VSG 29. Substantially all tracked packets may be followed in VSG 29 to facilitate learning application behavior associated with corresponding VMs 24(1)-24(M).

In other embodiments, application aware security module 22 may store the role profiles in port profiles 32(1)-32(M). In one embodiment, port profiles 32(1)-32(M) may include assigned properties (e.g., policies, features, rules, attributes) for servers 14(1)-14(N), and context-aware properties that map to specific ports (e.g., vNICs 30(1)-30(M)). In addition, port profiles 32(1)-32(M) may include role profiles of specific applications 26(1)-26(P) associated with the relevant VMs 24(1)-24(M).

VM 24(1) may have a particular port profile 32(1) when hosted on server 14(1); when VM 24(1) migrates to server 14(2), contents of port profile 32(1) may change accordingly. Similarly, port profile 32(1) associated with VM 24(1) may include certain policies related to application 26(1); if application 26(1) is no longer hosted by VM 24(1), contents of port profile 32(1) may change accordingly. The term "port profile" as used herein may refer to any container or object used to define policies or features that may be applied to a port (virtual or physical) such as vNIC 30(1)-30(M).

In some embodiments, port profiles 32(1)-32(M) may include properties that apply to all ports (e.g., vNICs 30(1)-30(M)) or properties that define members of a profile based on learned properties (e.g., application behavior). For example, the members may include all vNICs 30(1)-30(M) in a specific VLAN. In some embodiments, VSM 38 may co-operate with application aware security module 22 to aggregate application behavior into the role profiles, store, and manage the role profiles (e.g., distribute them according to network configuration and based on particular needs). Note that port profiles 32(1)-32(M) may encompass a large number of properties. More than one set of properties (e.g., which may be orthogonal and additive) may be selected for a given vNIC 30 and inserted into corresponding port profile 32.

Figure 3:
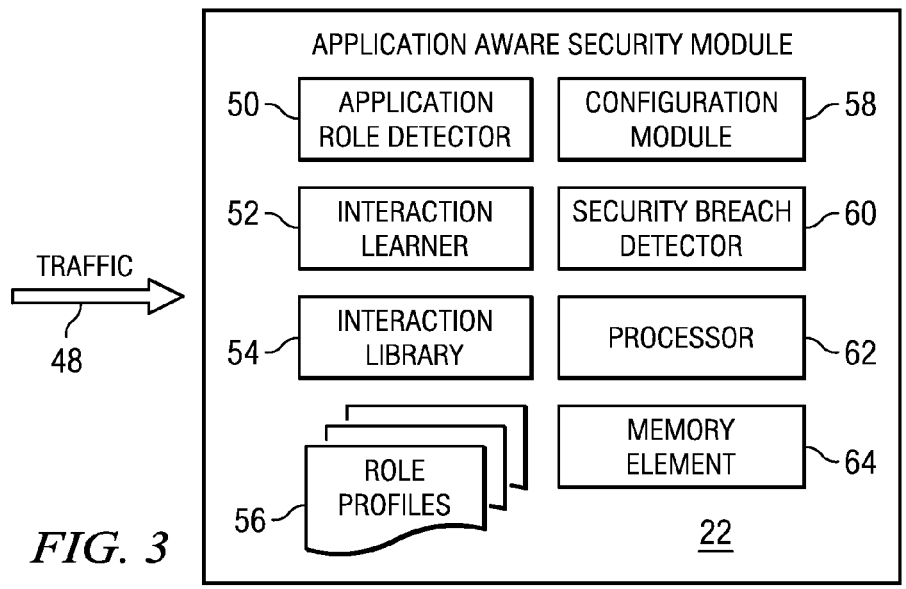
FIG. 3 is a simplified block diagram illustrating further example details of the system in accordance with one embodiment.

Turning to FIG. 3, FIG. 3 is a simplified block diagram illustrating additional details of communication system 10. Application aware security module 22 may analyze traffic 48 from distributed application 28. Application aware security module 22 may include an application role detector 50, an interaction learner 52, an interaction library 54, a plurality of role profiles 56, a configuration module 58, a security breach detector 60, a processor 62 and a memory element 64. In various embodiments, application aware security module 22 may obtain network traces (e.g., traffic 48) of system activity during the initial staging phase of distributed application 28.

Application aware security module 22 may use any known method to capture network traces. For example, suitable network monitors may be configured to capture packets at each network interface card (e.g., vNICs 30(1)-30(M)). The network monitors may gather statistics on all the frames detected across vNICs 30(1)-30(M), and provide the information to application aware security module 22. Information included in the network trace sent to application aware security module 22 may include source address of the computer that sent the frame onto network 12, destination address of the computer (or VM) that received the frame, protocols used to send the frame, data or a portion of the message that was sent, etc. In another embodiment, application aware security module 22 may use mobile agents that traverse network 12 and collect traffic information at each of vNICs 30(1)-30(M). Different monitoring algorithms and techniques may be implemented to determine various features such as burstiness of distributed application 28 (e.g., increase in traffic during a short time duration), duration of connections, etc. Certain off-the-shelf commercial products may also be used to monitor network traffic and obtain network traces of distributed application 30

Application role detector 50 may apply statistical analysis and probabilistic models (e.g., Bayesian and Markov models), algorithmic heuristics, and learning techniques to extract application roles in distributed application 28. Interaction learner 52 may extract the interaction pattern among these application roles. In one embodiment, interaction learner 52 may determine a connection graph among the application roles and extract a portion of the interaction pattern from the connection graph. As used herein, the term "connection graph" encompasses a graph comprising vertices (e.g., application roles) and directed edges (e.g., interactions), with each edge connecting one vertex to another. An example connection graph includes application roles (as vertices) and interactions (as directed edges) among the application roles. The connection graph can indicate an interaction pattern in two dimensions. For example, the connection graph may not include a time axis, and may not capture a sequence or order of events in time. The connection graph can be a simplified version (or a portion) of the interaction pattern that demonstrates which roles can communicate with each other, and whether the communication is uni-directional communication or bi-directional communication. Thus, the connection graph can shows the connection channels, but not the sequence of messages in time.

There are numerous methods to describe a connection graph, including visual (e.g., showing the vertices and directed edges) and mathematical (e.g., with an adjacency matrix consisting of entries $a_{ij}$, where $a_{ij}=1$ if a connection is present from vertex j to vertex i, and 0 otherwise). Connection graphs can generally include the following characteristics: directed edges (as opposed to un-directed or random edges), unweighted edges (e.g., adjacency matrix contains only positive entries), weighted edges (e.g., some interactions more prominent than others), simple edges (e.g., no multiple connections between vertex j and vertex i), and no self-connections (e.g., $a_{ii}$=0). Interaction learner 52 may use any known method (e.g., neural networks, heuristics, statistical models, topological ordering, etc.) to determine the connection graph among the application roles and extract a portion of the interaction pattern from the connection graph.

The interaction pattern may be stored in interaction library 54. Application aware security module 22 may generate role profiles 56 for each application role from the corresponding interaction pattern. Role profiles 56 may incorporate the corresponding application role's probabilistic interaction models including causal dependencies across various messages in each interaction pattern. The interaction models can help network operators better understand communication requirements across applications 26(1)-26(P) in network 12. In one embodiment, role profiles 56 may be represented by a Layer 2/Layer 3 ACL in a virtual switch (DVS 42) of network 12. In another embodiment, the role profile may be represented in a table format or event format in VSG 29 of network 12.

According to an embodiment of communication system 10, configuration module 58 may map role profiles 56 to instances of VMs 24(1)-24(M), for example, based on VM-predefined attributes, or dynamic detection via traffic monitoring, etc. Security breach detector 60 may detect, based on role profiles 56, security breaches in VMs 24(1)-24(M). For example, the interaction models from role profiles 56 can be leveraged to augment distributed firewalls (e.g., vPath infrastructure), by automatically generating application-aware access policies. Such a scheme may be effective in embodiments, where distributed monitors (e.g., vNICs 30(1)-34(M)) are deployed as close as possible to VMs 24(1)-24(M) running applications 26(1)-26(P). Application aware security module 22 may use processor 62 and memory element 64 to perform the operations described herein.

In various embodiments, the connection graph among the application roles may be used to generate fine-tuned static access policies for VMs 24(1)-24(M). A weighted connection graph may be further generated, taking into account statistical message rates on each of the edges in the connection graph, for example, to detect anomalies in traffic of VMs 24(1)-24(M) in network 12. For example, if a measured message rate varies from an expected message rate threshold in a specific VM 24, a fine-grained logging and monitoring of the communications of suspicious VM 24 can be automatically triggered.

In some embodiments, port profiles 32(1)-32(M) can be leveraged to identify and map application role profiles to deployed VMs 24(1)-24(M) and enforce access policies based on VM attributes. In one embodiment, the connection graph is used to generate access control lists for port profiles 32(1)-32(M). In another embodiment, the full interaction pattern is learned and monitored via state machines. In some embodiments, vPath technology together with VSG 29 can enable dynamic triggering of fine-grained logging and policy enforcement. In a more complex deployment, the access policies can take into account a state of the interaction and causal dependencies between messages in distributed application 28.

Security breach detector 60 may obtain port profile 32 of corresponding VM 24, and generate a small state machine that infers a partial state based on observed traffic at corresponding vNIC 30 (e.g., 30(1)). As used herein, a "state machine" is a program that specifies a number of well-defined resting states (e.g., 0 and 1); inputs to the state machine can cause the resting state to change depending on the intended purpose. The state machine can occupy only a single state at a time and can transition to another state only if a predefined condition is met. For example, a state machine may be designed to be in state 0 if event A is detected and in state 1 if event B is detected. The state machine may look for occurrences of detection of events A or B. If event A is detected, the state machine moves to state 0; if event B is detected, the state machine moves to state 1. The state of the state machine indicates the last event detected—if the state machine is in state 0, it implies that the last event detected was state A, and vice versa. Actions may be triggered based on the transition (e.g., notification actions at state transition), or based on the state (e.g., notification actions at state attainment). State machines may be generated using any programming code, language, script, program, etc. as appropriate and based on particular needs.

The small state machines may be run on each port (e.g., vNIC 30(1)-30(M)) associated with VMs 24(1)-24(M). In some embodiments, the small state machines may run on NICs 36(1)-36(N) of servers 14(1)-14(N) that host VMs 24(1)-24(M). The small state machine may inspect application level traffic at each of vNICs 30(1)-30(M) and detect an anomaly in traffic at corresponding vNICs 30(1)-30(M) based on the relevant access control policy. Inspecting the application level traffic may include inspecting application layers (e.g., session layer and presentation layer) in an Open System Interconnection (OSI) model of the traffic. Inspecting the application level traffic may also include inspecting any process-to-process communication. In some embodiments, an access control policy may indicate that an interaction may not be permitted from application 26(1) to 26(3), and the small state machine running at corresponding vNIC 30(1) may be configured to switch to state 1 from a default state 0 when the interaction from application 26(1) to application 26(3) is detected. Violations can lead to various actions depending on policy, for example, dropping packets, raising flags, fine-grained logging for further analysis, etc.

The interaction models can also be leveraged in distributed IDS 16 to improve anomaly detection based on application-specific interaction models. Application aware security module 22 can also learn application evolution. For example, application aware security module 22 can capture introduction of new modules in distributed application 28, or updates to existing applications (e.g. versioning), by both modular profiling of the new modules and by continuing a lightweight runtime learning process during application lifetime. As the result, network 12 can provide a distributed application-aware security service, enabling system and network administrators to detect and isolate security breaches and anomalies in a timely manner.

Some high level information about applications 26(1)-26(P) running in VMs 24(1)-24(M) may be available to network operators. However, network operators may not be aware of the specifics (e.g., message rates, application roles, etc.) of applications 26(1)-26(P) running on VMs 24(1)-24(M). As a result, detecting anomalies in traffic of VMs 24(1)-24(M) in network 12 based on high level statistics of traffic 48 that rarely take into account the specifics of applications 26(1)-26(P) and the interactions between distributed components thereof may not be effective. Fine grained changes in network 12 that can be due to security breaches and host-compromises may be hard to detect using such high-level statistics techniques. In addition, application aware security module 22 can allow the network operators to automatically build profiles (e.g., port profiles 32) for groups of VMs 24(1)-24(M) with the same attributes, and use these profiles for monitoring network 12 to enable early detection of anomalies. Furthermore, vPath technology together with VSG 29 can be used to automatically tune the level of logging on suspicious segments of network 12 and to dynamically enforce actions based on the state of the monitoring.

Figure 4:
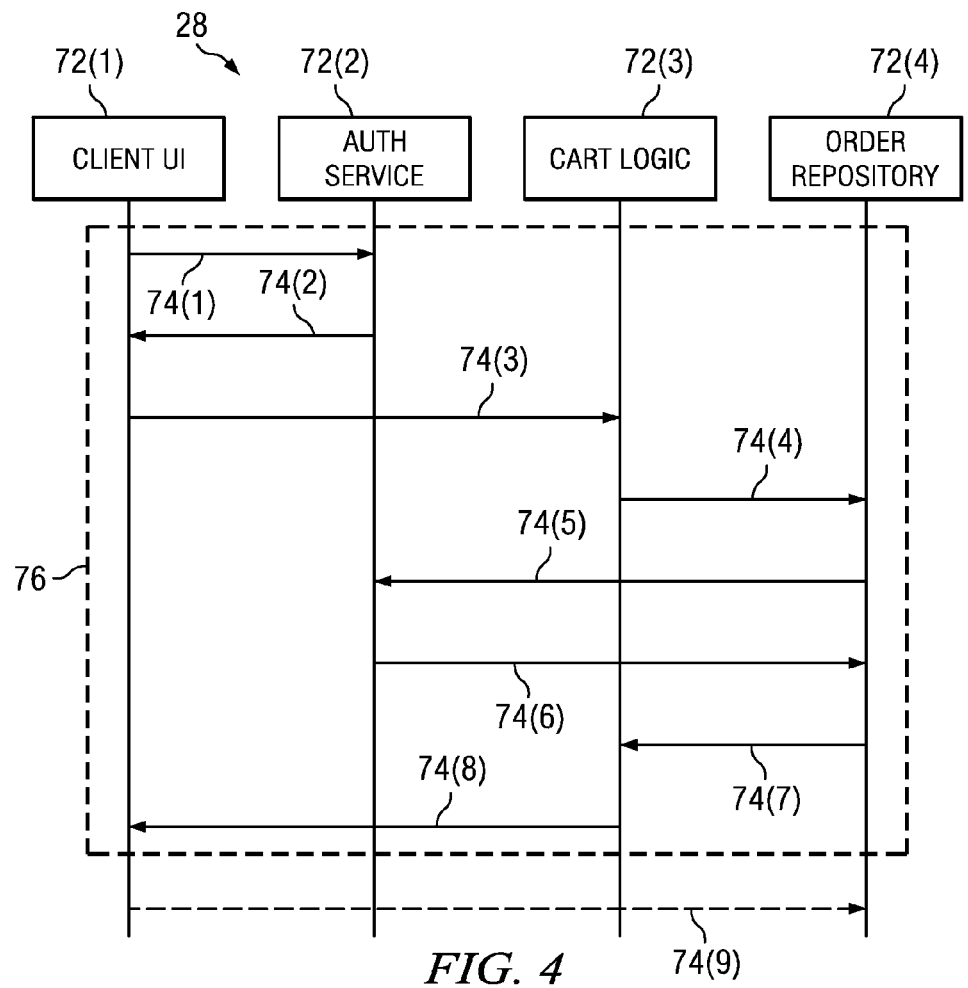
FIG. 4 is a simplified flow diagram illustrating example operations that may be associated with an embodiment of the system.

Turning to FIG. 4, FIG. 4 is a simplified flowchart illustrating application roles in an example distributed application. The example distributed application 28 may be an online store application. A user may log into a website through a user interface, and the user may be authorized to perform transactions thereon. The user may purchase items by clicking a 'buy' button, which automatically fills the user's virtual shopping cart. Information about the items in the shopping cart may be automatically sent to an order fulfillment interface, from where the user can complete the shopping transaction. Application roles 72(1)-72(4) in distributed application 28 may be characterized by observable external semantics of their methods when they receive (or send) a message. The semantic may be expressed by return values and messages sent to other application roles 72(1)-72(4) via interactions 74(1)-74(8). Interactions 74(1)-74(8) between application roles 72(1)-72(4) may specify how the component behavior should change so that the interaction semantic is valid. Application roles 72(1)-72(4) in example distributed application 28 may include applications 26(1)-26(P) running on various VMs 24(1)-24(M).

In terms of application roles and interactions, distributed application 28 may include the following application roles: application role 72(1), which may be a client user interface (client UI) such as a web browser; application role 72(2), which may be an authorization service; application role 72(3), which may be a cart logic; and application role 72(4), which may be an order repository. When the user logs into online store using application role 72(1) (client UI)—application role 72(1) may contact application role 72(2) (authorization service) for permission. An interaction 74(1) may be defined between application role 72(1) and 72(2), where parameters for authorization and authentication are communicated between application roles 72(1) and 72(2). Application role 72(2) may respond in an interaction 74(2) with a message authorizing the user to log into the website.

When the user purchases an item, an interaction 74(3) may occur between application role 72(1) and application logic 72(3) (cart logic), for example, where the item to be purchased is placed into a virtual shopping cart. Interaction 74(3) may trigger an automatic notification interaction 74(4) from application role 72(3) (cart logic) to 72(4) (order repository). Interaction 74(4) may trigger another interaction 74(5) from application role 72(4) (order repository) to 72(2) (authorization service), for example, to determine the validity of credit card numbers, etc. An authorization interaction 74(6) from application role 72(2) to 72(4) may indicate that the user's credit card is valid. Application role 72(4) may subsequently fulfill the order and inform application role 72(3) that the item may be removed from the shopping card in a notification interaction 74(7). A final notification interaction 74(8) from application role 72(4) to 72(1) may inform the user that the item is being shipped.

The sequence of interactions 74(1)-74(8) may form an interaction pattern 76 that is unique to example distributed application 28. Interactions that do not match interaction pattern 76 may indicate a security breach. For example, according to interaction pattern 76, application role 72(1) in example distributed application 28 should not send a message directly to application role 72(4). Thus, if an interaction 74(9) is detected between application roles 72(1) and 72(4), such an interaction may indicate a security breach of network 12. For example, such an interaction 74(9) may indicate a user attempting to bypass authorization to obtain a product fraudulently.

Figure 5:
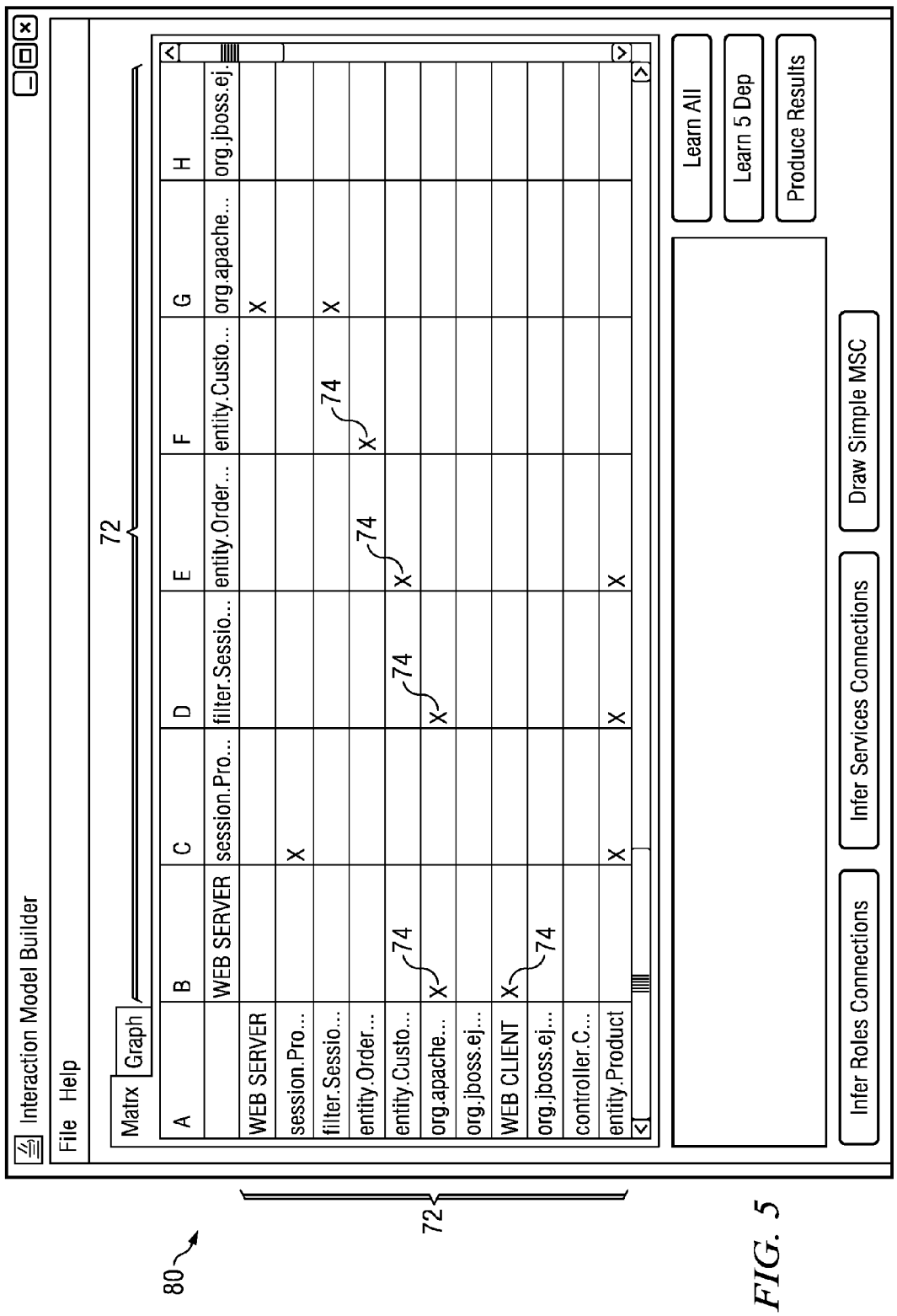
FIG. 5 is a simplified flow diagram illustrating further example operations that may be associated with an embodiment of the system.

Turning to FIG. 5, FIG. 5 is a simplified example screen shot illustrating application roles and interaction patterns in communication system 10. An example graphical user interface (GUI) 80 may show application role 72 and interaction 74 graphically. In an example embodiment, a network administrator can manually assign interaction 74 between one or more application role 72. For example, application role 72 comprising WEB CLIENT may be configured, through GUI 80, to interact with another application role 72 comprising WEB SERVER. In another example embodiment, interaction 74 and application role 72 may be learned by application aware security module 22, and displayed to the network administrator via GUI 80. The network administrator can thereby visually see interaction 74 and application role 72 to verify accuracy. In another example embodiment, various options (e.g., "infer role connections," "infer services connections" etc.) may be provided so that the network administrator can visually verify that application aware security module 22 is functioning as desired.

Figure 6:
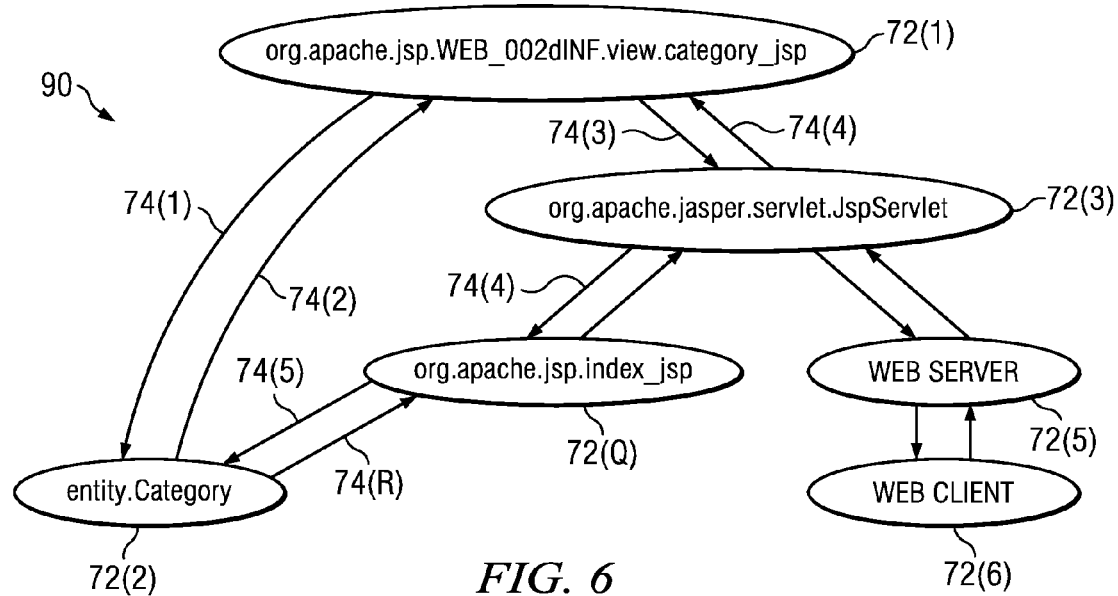
FIG. 6 is a simplified diagram illustrating an example connection graph between application roles and interactions.

Turning to FIG. 6, FIG. 6 is a simplified diagram illustrating an example connection graph 90 between application roles 72(1)-72(Q) and interactions 74(1)-74(R). Each application role 72 is a vertex and each interaction 74 is a directed edge in connection graph 90. Application role 72(1) ("org.apache.jsp.WEB_002dINF.view.category_jsp") in example distributed application 28 may have interaction 74(1) with application role 72(2) ("entity.Category"). Likewise, application role 72(2) may have interaction 74(2) with application role 74(1). Application role 72(1) may have interaction 74(3) with application role 72(3) ("org.apache.jasper.servlet.JspServlet"); likewise, application role 72(3) may have interaction 74(4) with application role 72(1). However, from connection graph 90, it is clear that application role 72(2) does not interact with application role 72(3), 72(5)("WEB SERVER") or 72(6)("WEB CLIENT"). From connection graph 90, application aware security module 22 may extract a portion of interaction pattern 76 comprising the interactions 74(1)-74(R) and corresponding application roles 72(1)-72(Q) for example distributed application 28. Any detected interaction that does not match interaction pattern 76 may be deemed to be a security breach. Further, depending on which interaction or application role presented the anomaly, the security breach can be mapped to the corresponding VMs 24(1)-24(M).

Figure 7:
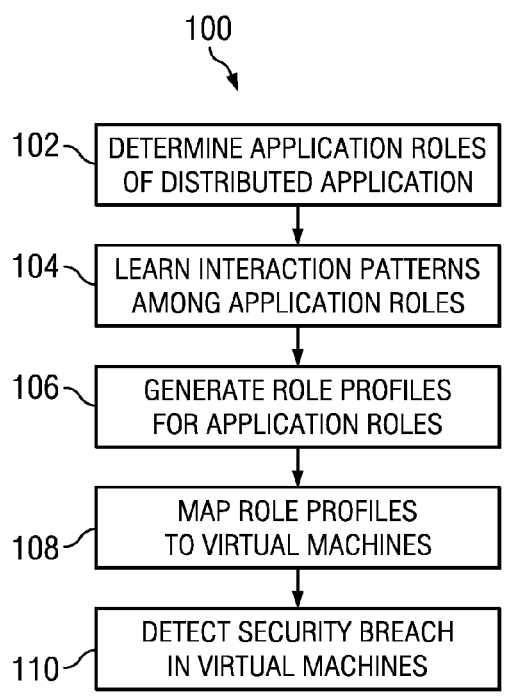

Turning to FIG. 7 FIG. 7 is a simplified flow diagram illustrating example operations to detect application level security breaches in network 12. Example operations 100 may include 102, where application role detector 50 may determine application roles 72(1)-72(Q) in distributed application 28. At 104, interaction learner 52 may learn interaction patterns 74(1)-74(R) among application roles 72(1)-72(Q). At 106, application aware security module 22 may generate role profiles 56 for application roles 72(1)-72(Q). In one embodiment, each of role profiles 56 may be associated with a corresponding one of application roles 72(1)-72(Q). At 108, configuration module 58 may map role profiles 56 to VMs 24(1)-24(M) according to the respective virtual machine attributes. At 110, security breach detector 60 may detect application level security breaches in network 12.

Turning to FIG. 8, FIG. 8 is a simplified flow diagram illustrating other example operations to detect application level security breaches in network 12. Operations 150 include 152, where application aware security module 22 may obtain network traces of distributed application 28. At 154, the network traces may be analyzed. At 156, connection graphs (e.g., 90) may be determined among application roles 72(1)-72(Q). At 158, interaction pattern 76 among application roles 72(1)-72(Q) may be extracted. At 160, application aware security policies may be generated. In an example embodiment, the connection graph may be applied to an access control list for the VM used to generate the application aware security policies. At 162, the application aware security policies may be applied to network 12. In some embodiments, applying the application aware security policies includes configuring VSG 29 and/or vPath 34(1)-34(N) appropriately. In other embodiments, applying the application aware security policies includes configuring firewall 16 appropriately. In yet other embodiments, applying the application aware security policies includes monitoring traffic at each vNICs 30(1)-30(M) using appropriate small state machines. In yet other embodiments, applying the application aware security policies includes monitoring traffic at each vNICs 30(1)-30(M) using appropriate port profiles 32(1)-32(M).

At 164, anomalies in message rates from and to virtual machines 24(1)-24(M) may be detected. Anomalies in message rates may include a change from expected behavior as determined from appropriate role profiles 56, for example, unexpected interactions between application roles. At 166, the application aware access policies may be enforced. In some embodiments, enforcing the application aware access policies may include monitoring traffic 48 and determining anomalies in application behavior. In other embodiments, enforcing the application aware access policies may include blocking unexpected interactions, notifying the network administrator (or user, as the case may be) of unexpected application behavior, quarantining the application or VM, or taking any suitable action as specified in the application aware access policies. At 168, traffic 48 may be logged. Logging traffic 48 may include logging interactions 74(1)-74(R) detected in traffic 48. In other embodiments, logging traffic 48 may include capturing source IP address, destination IP address, source port, destination port, protocol used, and other network characteristics. In some embodiments, the logs may be sent to a management application (such as VSM 38). In other embodiments, the logs may be stored and retrieved as needed. Other actions include re-directing traffic, dropping traffic, or allowing traffic in the network environment.

Turning to FIG. 9, FIG. 9 is a simplified flow diagram illustrating example operational steps associated with yet another embodiment of communication system 10. Operations 200 may include 202, where port profiles 32(1)-32(M) of VMs 24(1)-24(M) may be obtained. In an example embodiment, port profiles 32(1)-32(M) of VMs 24(1)-24(M) may be obtained from VSM 38. At 204, small state machines may be generated from interaction pattern 76 by security breach detector 60. At 206, the small state machines may be run on each port (e.g., vNIC 30(1)-30(M); NICs 36(1)-36(N)) associated with VMs 24(1)-24(M). At 208, the small state machines may inspect application level traffic 48 in network 12. At 210, the small state machines may detect anomaly in traffic at each port. For example, the detection may be achieved through state transitions from one state to another, indicating an anomaly event.

At 212, application aware security module 22 may continuously learn application evolution. For example, distributed application 28 may include application roles 72(1)-72(Q). Interaction pattern 76 determined from a staging phase may indicate that application role 72(1) does not interact with application role 72(3). However, after deployment, an interaction may be observed between application role 72(1) and 72(3). The interaction may trigger an anomaly detector. Nevertheless, the interaction may be determined to be legitimate, for example, after review of distributed application 28. The newly learnt interaction may be subsequently added to interaction pattern 76. At 214, application aware security module 22 may notify a network administrator, management application, VSM 38, user or other entity about any abnormal activity detected in network 12.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In example implementations, at least some portions of the activities outlined herein may be implemented in software in, for example, application aware security module 22. In some embodiments, one or more of these features may be implemented in hardware, provided external to these elements, or consolidated in any appropriate manner to achieve the intended functionality. The various network elements (e.g., application aware security module 22) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, application aware security module 22 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 64) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 62) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory element 64) for storing information to be used in achieving operations as outlined herein. These devices may further keep information in any suitable type of non-transitory storage medium (e.g., random access memory (RAM), read only memory (ROM), field programmable gate array (FPGA), EPROM, EEPROM, etc.), software, hardware, or in any other suitable component, device, element, or object where appropriate and based on particular needs. The information being tracked, sent, received, or stored in a communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executing in an application aware security module, comprising:
    detecting an application role in a plurality of application roles of a distributed application executing in a plurality of virtual machines in a network environment;
    generating a role profile for the application role from an interaction pattern of the application role with the other application roles in the distributed application;
    mapping the role profile to a virtual machine (VM) executing the application role;
    generating a small state machine from the role profile;
    running the small state machine on a port associated with the VM;
    inspecting an application level traffic at the port; and
    determining an anomaly in traffic of the VM based on a change of state of the small state machine, wherein the anomaly indicates a security breach of the VM.

2. The method of claim 1, wherein the role profile includes interaction libraries capturing the interaction pattern of the application role.

3. The method of claim 1, wherein the detecting the application role comprises:
    obtaining network traces of the distributed application; and
    analyzing the network traces to extract the application role.

4. The method of claim 1, wherein detection of the security breach comprises:
    generating an access control policy for the VM from the role profile; and
    determining an anomaly in traffic of the VM based on the access control policy.

5. The method of claim 4, further comprising:
    configuring a firewall with the access control policy.

6. The method of claim 1, further comprising:
    including the role profile in a port profile of the VM.

7. The method of claim 1, further comprising:
    determining a connection graph among the application roles in the distributed application; and
    applying the connection graph to an access control list for the VM.

8. The method of claim 1, further comprising performing a selected one of a group of actions, the group consisting of:
    a) logging traffic patterns;
    b) re-directing traffic;
    c) dropping traffic; and
    d) allowing traffic in the network environment.

9. The method of claim 1, further comprising:
    continuously learning the distributed application, which includes adding newly learnt legitimate interactions to the interaction pattern.

10. Logic encoded in non-transitory media that includes instructions for execution and when executed by a processor, is operable to perform operations comprising:
    detecting an application role in a plurality of application roles of a distributed application executing in a plurality of virtual machines in a network environment;
    generating a role profile for the application role from an interaction pattern of the application role with the other application roles in the distributed application;
    mapping the role profile to a virtual machine (VM) executing the application role;

generating a small state machine from the role profile;
running the small state machine on a port associated with the VM;
inspecting an application level traffic at the port; and
determining an anomaly in traffic of the VM based on a change of state of the small state machine, wherein the anomaly indicates a security breach of the VM.

11. The logic of claim 10, wherein the detecting the application role comprises:
obtaining network traces of the distributed application; and
analyzing the network traces to extract the application role.

12. The logic of claim 10, wherein detection of the security breach comprises:
generating an access control policy for the VM from the role profile; and
determining an anomaly in traffic of the VM based on the access control policy.

13. The logic of claim 10, wherein the operations further comprise:
including the role profile in a port profile of the VM.

14. The logic of claim 10, further comprising:
determining a connection graph among the application roles in the distributed application; and
applying the connection graph to an access control list for the VM.

15. An apparatus, comprising:
a memory element for storing data; and
a processor operable to execute instructions associated with the data, wherein the processor and the memory element cooperate, such that the apparatus is configured for:
detecting an application role in a plurality of application roles of a distributed application executing in a plurality of virtual machines in a network environment;
generating a role profile for the application role from an interaction pattern of the application role with the other application roles in the distributed application;
mapping the role profile to a virtual machine (VM) executing the application role;
generating a small state machine from the role profile;
running the small state machine on a port associated with the VM;
inspecting an application level traffic at the port; and
determining an anomaly in traffic of the VM based on a change of state of the small state machine, wherein the anomaly indicates a security breach of the VM.

16. The apparatus of claim 15, wherein the detecting the application role comprises:
obtaining network traces of the distributed application; and
analyzing the network traces to extract the application role.

17. The apparatus of claim 15, wherein detection of the security breach comprises:
generating an access control policy for the VM from the role profile; and
determining an anomaly in traffic of the VM based on the access control policy.

18. The apparatus of claim 15, further configured for:
including the role profile in a port profile of the VM.

19. The apparatus of claim 15, further comprising:
determining a connection graph among the application roles in the distributed application; and
applying the connection graph to an access control list for the VM.

20. The apparatus of claim 15, further comprising performing a selected one of a group of actions, the group consisting of:
a) logging traffic patterns;
b) re-directing traffic;
c) dropping traffic; and
d) allowing traffic in the network environment.

* * * * *